United States Patent
Rothaug

(10) Patent No.: US 7,059,335 B2
(45) Date of Patent: Jun. 13, 2006

(54) PROCESS FOR TREATING MOULDS OR MOULD HALVES FOR THE PRODUCTION OF OPHTHALMIC LENSES

(75) Inventor: Michael Rothaug, Grossostheim (DE)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 10/353,532

(22) Filed: Jan. 29, 2003

(65) Prior Publication Data

US 2003/0163196 A1 Aug. 28, 2003

(51) Int. Cl.
*B08B 9/00* (2006.01)

(52) U.S. Cl. .................. 134/1.1; 134/22.1; 216/74; 216/79; 216/80

(58) Field of Classification Search ............ 351/160 H, 351/160 R, 161, 162, 177; 430/245.1, 270.1; 428/428; 427/162, 164; 134/1.1, 22.1; 216/74, 216/79, 80
See application file for complete search history.

(56) References Cited

U.S. PATENT DOCUMENTS

| | | | | |
|---|---|---|---|---|
| 3,953,115 A | * | 4/1976 | French et al. ............... 351/166 |
| 4,096,315 A | * | 6/1978 | Kubacki ..................... 428/412 |
| 4,381,963 A | * | 5/1983 | Goldstein et al. ........... 156/245 |
| 4,599,272 A | * | 7/1986 | Ichikawa .................... 428/412 |
| 4,765,729 A | * | 8/1988 | Taniguchi ................... 351/163 |
| 4,830,879 A | * | 5/1989 | Debsikdar ................... 427/162 |
| 4,882,238 A | | 11/1989 | Yoshioka et al. ........... 428/698 |
| 4,948,627 A | * | 8/1990 | Hata et al. .................. 427/574 |
| 5,679,385 A | | 10/1997 | Adams et al. ............. 425/174.4 |
| 5,851,252 A | * | 12/1998 | Sato et al. ...................... 65/24 |
| 6,051,310 A | * | 4/2000 | Cano et al. ................. 428/336 |
| 6,164,777 A | * | 12/2000 | Li et al. ...................... 351/162 |
| 6,175,450 B1 | * | 1/2001 | Andreani et al. ........... 359/586 |
| 6,193,369 B1 | * | 2/2001 | Valint et al. ............ 351/160 H |
| 6,238,800 B1 | * | 5/2001 | Nishimura .................. 428/428 |
| 6,335,142 B1 | * | 1/2002 | Quesnel et al. .......... 430/275.1 |
| 6,841,008 B1 | * | 1/2005 | Branco et al. ................ 134/26 |
| 2002/0064597 A1 | * | 5/2002 | Suzuki et al. ............... 427/162 |
| 2002/0163619 A1 | | 11/2002 | Matsuzawa et al. ........ 351/159 |
| 2004/0211217 A1 | * | 10/2004 | Shigeaki ........................ 65/26 |

FOREIGN PATENT DOCUMENTS

| | | |
|---|---|---|
| EP | JP 61272362 | 2/1986 |
| EP | JP 06320636 | 11/1994 |
| EP | 0 841 140 | 5/1998 |
| JP | 02-038330 | * 7/1990 |
| JP | 06-345447 | * 12/1994 |
| WO | WO 00/76738 | 12/2000 |

* cited by examiner

*Primary Examiner*—Bernard Lipman
(74) *Attorney, Agent, or Firm*—Karen A. Borrelli

(57) ABSTRACT

In a process for treating moulds or mould halves (3) for the production of ophthalmic lenses, in particular contact lenses, the moulds or mould halves (3) are exposed to a plasma at least in the area of their shaping surfaces (310).

7 Claims, 1 Drawing Sheet

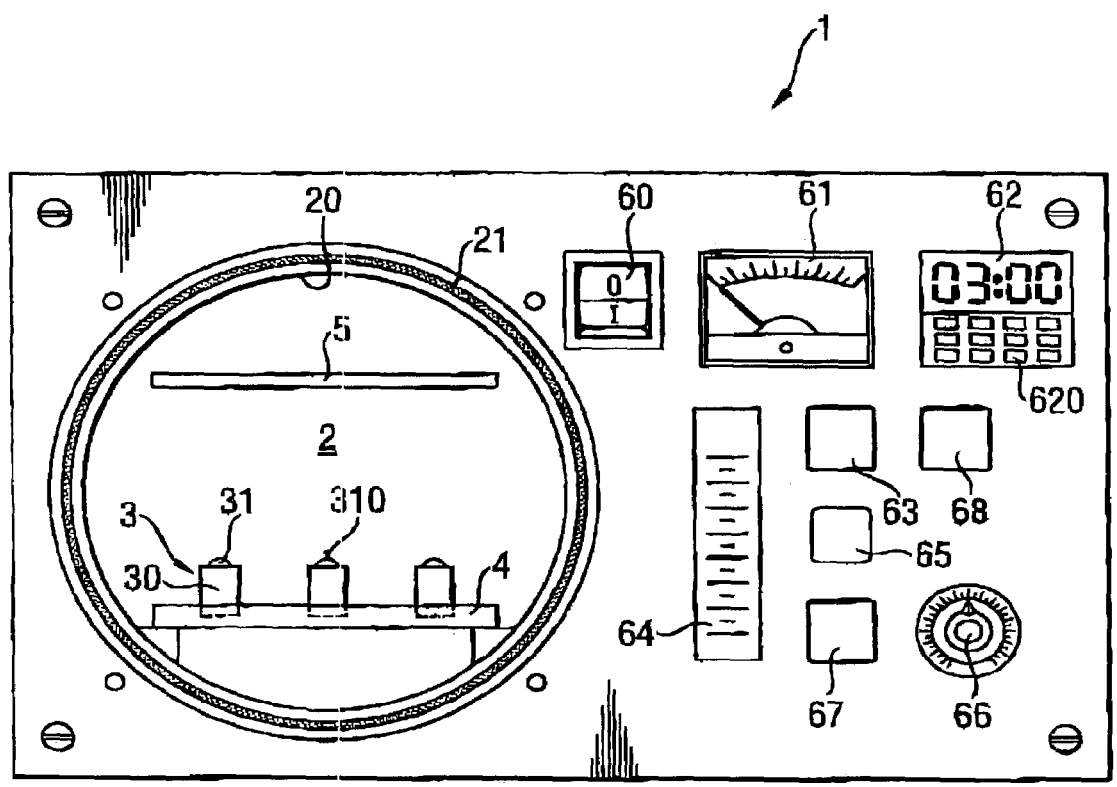

PROCESS FOR TREATING MOULDS OR MOULD HALVES FOR THE PRODUCTION OF OPHTHALMIC LENSES

This application claims benefit under 35 USC §119 of European patent application No. EP 02002351.1 filed Jan. 31, 2002, the contents of which are incorporated herein by reference.

The invention relates to a process for treating moulds or mould halves for the production of ophthalmic lenses, in particular contact lenses. Moulds and mould halves are to be understood here as new moulds or mould halves and also as used and polished mould halves which are intended to be used again.

Today, production of contact lenses in very large batch numbers is typically done using casting processes. The individual moulds used for the production of a contact lens typically comprise two mould halves, a male mould half with a convex shaping surface for shaping the concave rear face of the contact lens, and a female mould half with a concave shaping surface for shaping the convex front surface of the contact lens. With the mould closed, a cavity is obtained between the convex shaping surface of the male mould half and the concave shaping surface of the female mould half, and this cavity defines the configuration of the contact lens.

With the mould open, a precisely dosed amount of a starting material is first introduced into the female mould half. The mould is then closed and the starting material is polymerized and/or crosslinked by delivery of suitable energy, for example UV light. In this way, a contact lens is produced which can be removed from the mould and which, depending on the starting material used and depending on the mould used, does not require any further treatment.

When producing contact lenses in very large batch numbers, a possible material which can be used for the area with the shaping surface is in particular quartz glass (for example for the mould halves with the convex shaping surface) or glass called BK7 from the company Glaswerke Schott, Mainz, Germany (for example for the mould. halves with the concave shaping surface). Moulds or mould halves in which these materials are employed for the shaping surfaces can be re-used many times while maintaining the high quality of the contact lenses produced with them.

However, faulty contact lenses may occur when producing contact lenses using moulds or mould halves of this kind. In particular, for example, cracks may occur in the contact lenses. These contact lenses then have to be discarded as reject material. Reject material is also undesirable because it reduces the efficiency of the process. Experience shows that the cracks in the contact lenses occur more frequently in new moulds or mould halves than in moulds or mould halves which have already been in use for some time and with which, therefore, quite a large number of contact lenses have already been produced. This phenomenon may be due, among other things, to the relatively strong adhesion forces between the contact lenses and the new moulds or mould halves.

For this reason, the moulds or mould halves are first of all treated prior to use, before they are employed in the final production process. To this end, at least the shaping surfaces of the moulds or mould halves are irradiated with UV light (burn-in) for a period of many hours (for example two hundred hours). As an alternative to the aforesaid pre-treatment, or in combination with it, the moulds or mould halves are first used on a test installation in which contact lenses are initially produced with them on a trial basis (but not dispensed) over a fairly long period of time in order for the moulds or mould halves to be "run in" prior to the final production process.

When the moulds have been suitably pre-treated and/or "run in", and they are then also used within the next few days in the final production process, the low reject rates required in the final production process are generally achieved with these moulds. However, this procedure requires relatively elaborate planning, and, even then, not all moulds or mould halves can be used (defective contact lenses still occur with some moulds or mould halves in the trial production of contact lenses). The aforementioned considerations apply also correspondingly to already used and polished moulds or mould halves which are intended to be used again after polishing.

The present invention aims to remedy this situation by proposing a process for treating such moulds or mould halves which is much less complex. Where the text below mentions the treatment of a mould, this also includes the treatment of a mould half, or even a mould part of a mould if the mould is made up of more than two parts.

According to the invention, a process is proposed which is characterized by the features of the independent patent claim. Advantageous variants of the method will be evident from the features of the dependent patent claims.

In particular, the moulds or mould halves are therefore exposed to a plasma at least in the area of their shaping surfaces. For this purpose, the moulds can be introduced into the plasma treatment chamber of a conventional plasma treatment installation and can be exposed there to a suitable plasma, for example an oxygen plasma, for a period of a few minutes. Following this plasma treatment, the moulds thus treated can be used directly in the final production process. For safety, however, contact lenses are preferably produced for a period of time for test purposes before the moulds thus treated are used, although this can be done for example on the installation used for the final production of the contact lenses. However, the contact lenses produced for test purposes are not dispensed and instead are separated from the production line and tested. Nevertheless, a complex pre-treatment and/or a complex running-in of the moulds or mould halves, similar to that described in the introduction, can be dispensed with.

Particularly low reject rates can be achieved with moulds in which the shaping surfaces of the moulds are made of glass, in particular of quartz glass, or of the glass already mentioned in the introduction and referred to by the designation BK7. These are customary materials which have proven extremely suitable for re-use in the production of contact lenses in very large batch numbers. To this extent, already used and polished moulds or mould halves can also be re-used and subjected to the aforementioned treatment.

The invention is explained below in more detail with reference to the drawing. The single figure in the drawing shows a front view of a plasma treatment installation known per se, for example a treatment installation of the type PlasmPrep5 from the company Gala Labor Instrumente GmbH, D-65307 Bad Schwalbach, Germany, in which a plasma, in particular an oxygen plasma, can be generated, and in which the moulds or mould halves to be treated are introduced before the plasma is generated.

The plasma treatment installation 1 comprises a treatment chamber 2 into which the articles to be treated, in the present case the moulds or mould halves 3, can be introduced, and from which the moulds or mould halves 3 can be removed once plasma treatment has been completed. To this end, for example, several moulds or mould halves 3 can be arranged on a metal plate 4 which has depressions in which the mounts 30 for the mould halves 3 are received. The metal plate 4 can be moved into the treatment chamber 2, so that the mould halves 3 can be introduced into the depressions of the metal plate 4 outside the treatment chamber 2 and the metal plate 4 can then be introduced into the treatment chamber 2. The metal plate 4 forms one of the two electrodes between which the plasma is ignited. Three of the male mould halves 3 arranged on the metal plate 4 can be seen in the figure, and in each case the mount 30 and the insert 31 with the shaping surface 310 can be seen on each mould half 3. In the treatment chamber 2, a further electrode 5 is visible which is arranged lying opposite the metal plate 4 so that the mould halves 3 with the shaping surfaces to be treated are arranged between the metal plate 4 (which forms the one electrode) and the electrode 5, where the plasma is ignited in operation. Arranged around the opening 20 there is a seal 21 for a closure flap (not shown) which is used to close the treatment chamber 2 after the metal plate 4 has been introduced.

The figure also shows a number of operating and display elements, for example a mains switch 60, a pressure display 61 for displaying the pressure in the treatment chamber 2, a timer 62 with operating keys 620 with which it is possible to control the time during which the mould halves 3 or the shaping surfaces are exposed to the plasma. The figure also shows an operating switch 63 for a vacuum pump for evacuating the treatment chamber 2 before, subsequent to this evacuation of the treatment chamber 2, the oxygen for the plasma is introduced into the treatment chamber 2. For controlled introduction of the oxygen into the interior of the treatment chamber, a needle valve 64 is provided, and the fact that oxygen is flowing into the treatment chamber can be seen not only from the needle valve 64 but also from a control light 65. A rotary potentiometer 66 is also shown which regulates the electrical output for igniting and maintaining the plasma in the treatment chamber 2, and a switch 67 for turning on the generator. Finally, the figure also shows a switch 68 for ventilating (flooding with air) the treatment chamber 2 after plasma treatment of the mould halves 3 is completed.

For the plasma treatment of the mould halves 3, these are first fitted into the depressions in the metal plate 4 withdrawn from the treatment chamber 2. The metal plate 4 is then introduced into the treatment chamber 2 and the closure flap (not shown) is closed. The oxygen canister (not shown) for oxygen supply is opened. The vacuum pump is then switched on via the switch 63 and the treatment chamber 2 is evacuated. When a pressure of 0.4 mbar, for example, is reached, oxygen is automatically delivered, and thus oxygen flows into the treatment chamber 2, and the pressure in the treatment chamber 2 rises initially to 1.0 mbar, for example. The rotary potentiometer 66 is set so that the electrical output delivered is forty-four watt for example. Evacuation of the treatment chamber 2 proceeds until, for example, a pressure of only 0.2 mbar is reached. The generator is then turned on via the switch 67 and the oxygen plasma in the treatment chamber 2 is ignited. This can be observed through the glass in the closure flap, the plasma ignition causing a bluish light in the treatment chamber 2. During a treatment time of two to three minutes for example (a treatment time of three minutes is shown on the timer 63 in the figure), the mould halves with the shaping surfaces are now exposed to the oxygen plasma.

Once this plasma etching time set on the timer 63 has elapsed, the generator is automatically turned off and the delivery of oxygen to the treatment chamber 2 is also interrupted (control light 65 no longer lit). The plasma treatment (plasma etching) of the mould halves 3 or the shaping surfaces is now ended. The vacuum pump is now switched off by actuating the switch 63, and the treatment chamber 2 is ventilated (flooded with air) by actuating the switch 68, for example for a period of thirty seconds. The mains switch 60 is then actuated and the plasma treatment installation 1 is switched off. Finally, the closure flap (not shown) is removed, the metal plate 4 is withdrawn from the treatment chamber 2, and the mould halves 3 can be removed from the metal plate 4.

The mould halves 3 which have been pre-treated in this way can in principle be used directly in the production process. For safety reasons, however, before producing contact lenses which are then finally dispensed, it is preferable to first use the pre-treated mould halves 3 to produce a number of contact lenses which are then thoroughly checked before such contact lenses are produced which are finally dispensed. After the plasma treatment, the pre-treated mould halves 3 can also be run-in for a period of time before they are used to produce contact lenses which are then definitively dispensed. Nevertheless, the process of pre-treatment of the mould halves 3 is considerably less onerous than before. At the end of the run-in period, a new check can be carried out on a number of contact lenses and, if this check gives a successful result, these mould halves 3 can then be used to produce contact lenses which are then finally dispensed.

The invention claimed is:

1. A process for treating moulds or mould halves for the production of ophthalmic lenses, comprising the steps of: providing a mould or mould half comprising a shaping surface made of glass; exposing the mould or mould half to an etching plasma at least in the area of the shaping surface; wherein the area of the shaping surface of the mould or mould half is exposed to the etching plasma prior to its use in a lens production process so as to reduce adhesion forces between the treated mould or mould half and the lens produced, and dosing a lens material in direct contact with the plasma etched shaping surface.

2. A process according to claim 1, in which the etching plasma to which the moulds or mould halves are exposed at least in the area of their shaping surfaces is an oxygen plasma.

3. A process according to claim 1, wherein the mould or mould half has been used or polished.

4. A process of claim 1, wherein the ophthalmic lenses are contact lenses.

5. A process according to claim 1, wherein the glass is quartz or borosilicate crown glass.

6. A process according to claim 2, wherein the mould or mould half has been used or polished.

7. A process according to claim 2, wherein the glass is quartz or borosilicate crown glass.

* * * * *